United States Patent Office 3,033,487
Patented May 8, 1962

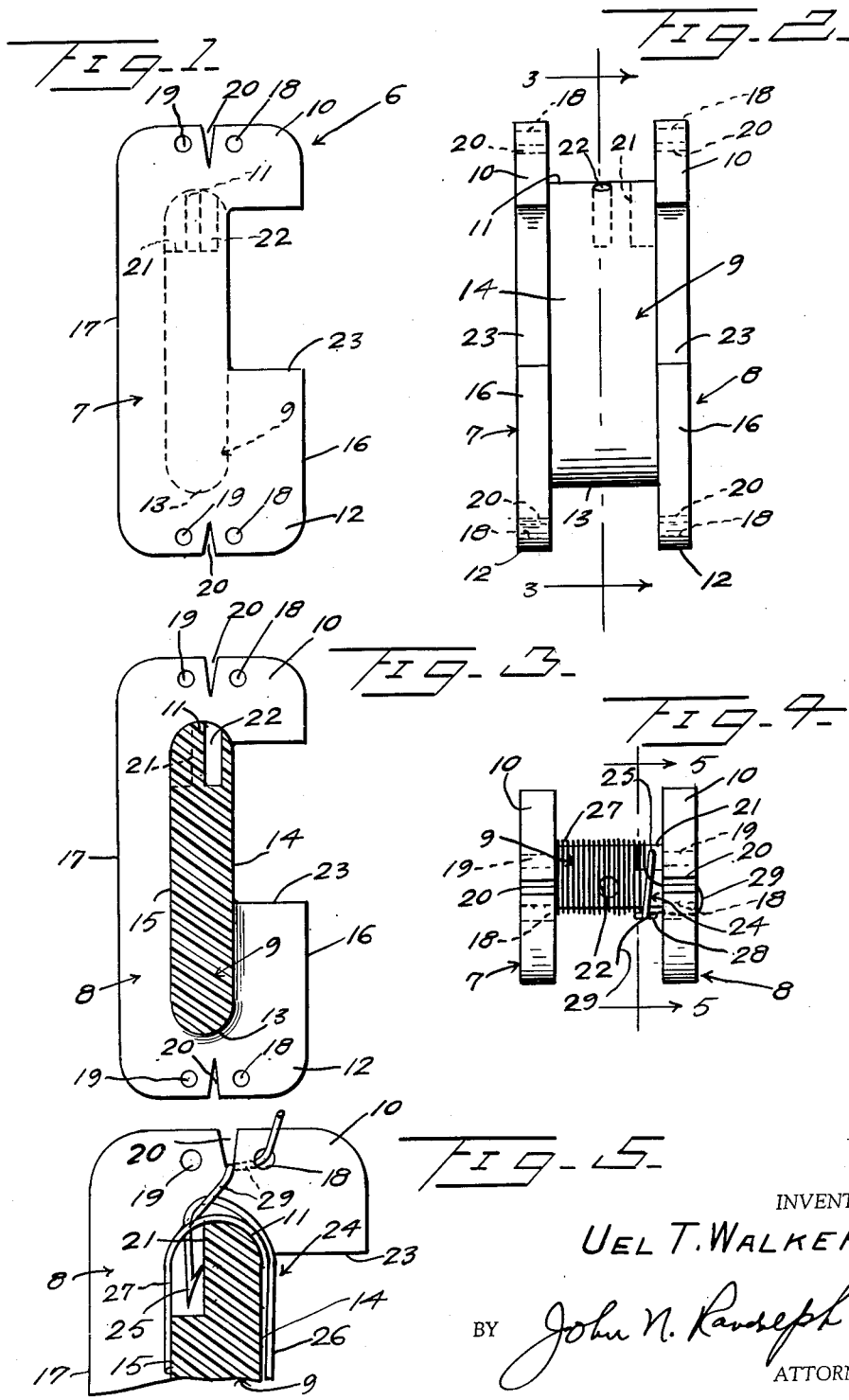

3,033,487
FISHHOOK AND LEADER HOLDER
Uel T. Walker, 205 Orchard Drive, Bristol, Tenn.
Filed Apr. 12, 1961, Ser. No. 102,591
4 Claims. (Cl. 242—85.1)

This invention relates to a holder for conveniently and safely storing a fishhook and leader in a manner so that said parts will not be accidentally disengaged from the holder, but which will enable said parts to be readily disengaged for use.

Another object of the invention is to provide a holder to which a fishhook and its attached leader can be quickly applied and secured so that a number of the holders, each carrying a fishhook and leader, may be conveniently carried in a garment pocket without risk of the fishhooks and leaders becoming entangled.

Still a further object of the invention is to provide a holder adapted to accommodate flies or other artificial lures attached to or associated with a fishhook and/or sinkers clamped or otherwise fastened to a leader.

Still another object of the invention is to provide a holder adapted to receive fishhooks of different sizes and for holding the hook in a manner so that its barbed point will be shielded.

Various other objects and advantages of the invention will hereinafter become more fully apparent from the following description of the drawing, illustrating a presently preferred embodiment thereof, and wherein:

FIGURE 1 is a side elevational view of the holder;

FIGURE 2 is a front elevational view thereof, looking from right to left of FIGURE 1;

FIGURE 3 is a longitudinal sectional view taken substantially along a plane as indicated by the line 3—3 of FIGURE 2;

FIGURE 4 is an end elevational view of the holder, looking from top to bottom thereof, as seen in FIGURES 1 and 2, and showing a fishhook and leader applied thereto, and FIGURE 5 is a fragmentary sectional view, on an enlarged scale, taken substantially along a plane as indicated by the line 5—5 of FIGURE 4.

Referring more specifically to the drawing, the fishhook and leader holder in its entirety is designated generally 6 and includes two corresponding rigid side plates 7 and 8 and a rigid spacing member 9. The spacing member 9 is disposed between the side plates 7 and 8 and may be formed integral therewith or rigidly secured thereto in any conventional manner.

The side plates 7 and 8 have complementary end portions 10 which are disposed beyond a convexly rounded end portion 11 of the spacing member 9; and opposite complementary end portions 12 which are disposed beyond and spaced from the other convexly rounded end portion 13 of the member 9. The member 9 has substantially flat parallel side faces 14 and 15 which extend between and merge with the rounded ends 11 and 13. The thickness of the spacing member 9, as measured between its side faces 14 and 15, is substantially less than the width of the side plates 7 and 8, as measured between their complementary longitudinal side edges 16 and 17, and the spacing member 9 is disposed so that its side faces 14 and 15 are set inwardly with respect to said side edges 16 and 17.

Each end portion 10 and 12 of each side plate 7 and 8 is provided with a pair of transversely spaced openings 18 and 19 and with a substantially V-shaped notch 20. The notch 20 opens outwardly of the end portion of which it forms a part, is tapered inwardly and is disposed between the openings 18 and 19.

The rounded end 11 has a recess 21 which opens outwardly thereof and outwardly of a portion of the face 15 which is disposed adjacent to the side plate 8 which closes a side of said recess. The end portion 11 is also provided with a blind bore 22 which is disposed approximately midway of the side plates 7 and 8 and nearer the face 14 than the face 15.

The side plates 7 and 8 are provided with corresponding cutouts or recesses 23 which open through the longitudinal edges 16 and which are disposed nearer the end portions 10 and the end portions 12. A portion of the face 14 is disposed substantially flush with inner portions of the recesses 23 and which recesses extend from near the rounded end 11 of the spacing member 9 to a point approximately midway of the ends of said spacing member.

A conventional fishhook 24 is shown in FIGURES 4 and 5 applied to the spacing member 9 with the barbed point 25 of the fishhook disposed in the recess 21 and with the hook shank 26 extending downwardly along the front face 14. One end of a leader 27 is fastened to the eye 28 of the hook shank 26 and said leader is wound about the spacing member 9 a number of times. The free end 29 of the leader 27 is anchored to the most conveniently located end portion 10 or 12 by being passed outwardly through the notch 20 thereof and then inwardly through one of the openings 18 or 19, between which said notch is disposed, the leader end 29 being shown extending inwardly through the opening 18. The portion 29 is wedged in the notch 20, and as fishing leaders are usually formed of nylon or gut which, while flexible, is not limp and has a tendency to straighten, the terminal part of the leader which extends inwardly through the opening 18 will tend to assume a position nearly in alignment with the part thereof extending upwardly toward the notch 20, to resist being displaced back through said opening 18, so as to effectively anchor the leader end 29 to the end portion 10, even if the leader is not tightly wedged in the notch 20. If desired, the leader end 29 can be passed back outwardly through the other opening 19 or may be otherwise engaged with one or both of a pair of openings 18 and 19 and its associated notch for effectively anchoring the leader to the holder but in a manner so that it can be readily detached.

The holder 6 may be utilized with fishhooks smaller than the fishhook 24 and wherein less spacing exists between the barbed point and hook shank, in which case the barbed point is received in the socket or blind bore 22 and the hook shank extends downwardly along the front face 14; or for fishhooks larger than the fishhook 24, the barbed point 25 is disposed against the rear face 15 and spaced from the recess 21 with the hook shank 27 extending along the front face 14. The recesses 23 enable the fingers to be conveniently inserted into the holder 6 for grasping the fishhook to apply it in any one of the three aforementioned positions, or for removing the fishhook from the spacing member 9 after the leader 27 has been unwound.

The holder 6 may be formed of plastic or other lightweight material and may be constructed in various sizes. The holder 6 is of adequate size so that it will accommodate a fly or other artificial lure, not shown, attached to the fishhook or with which the fishhook is associated, and/or a sinker, not shown, clamped or otherwise fastened to a part of the leader.

Various modifications and changes are contemplated and may be resorted to, without departing from the function or scope of the invention as hereinafter defined by the appended claims.

I claim as my invention:

1. A fishhook and leader holder comprising a pair of corresponding side plates, a spacing member interposed between and connected to said side plates and by which said side plates are maintained in spaced apart relation to one another, said side plates and spacing member being elongated and said spacing member extending lengthwise of the side plates and having rounded ends and substantially parallel side faces, said side plates having end portions disposed beyond said rounded ends and side edges overlapping and spaced outwardly from said side faces, said spacing member providing an elongated spool portion on which a fishing leader is adapted to be wound and having a recess opening outwardly of one of said rounded ends for detachably receiving and holding the barbed end of a fishhook attached to an end of said leader when the hook shank is disposed along one of said side faces, and one end portion of one of said side plates having an inwardly tapered notch in which a part of the other leader end is adapted to be detachably wedged and an opening laterally spaced from the notch and through which a terminal part of the last mentioned leader end extends for retaining said leader part wedged in the notch.

2. A fishhook and leader holder as in claim 1, complementary side edges of said side plates having cutouts extending inwardly to and exposing a portion of said side face of the spacing member and extending to adjacent said rounded end to facilitate applying the fishhook to the spacing member and removing it therefrom.

3. A fishhook and leader holder as in claim 1, said recess opening outwardly of the other side face and being disposed remote from said first mentioned side face.

4. A fishhook and leader holder as in claim 1, said recess comprising a blind bore spaced from and disposed with its axis substantially parallel to said side face.

References Cited in the file of this patent

UNITED STATES PATENTS

| | | |
|---|---|---|
| 2,265,126 | Bersche | Dec. 9, 1941 |
| 2,596,896 | Goad | May 13, 1952 |
| 2,683,937 | Criswell | July 2, 1954 |
| 2,826,856 | Marion et al. | Mar. 18, 1958 |
| 2,831,289 | Klinghoffer | Apr. 22, 1958 |
| 2,936,963 | Witte | May 17, 1960 |